(12) United States Patent
Katagiri

(10) Patent No.: US 7,571,885 B2
(45) Date of Patent: Aug. 11, 2009

(54) CONTAINER HOLDER

(75) Inventor: Katsuhiro Katagiri, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 574 days.

(21) Appl. No.: 11/169,581

(22) Filed: Jun. 30, 2005

(65) Prior Publication Data
US 2006/0006185 A1    Jan. 12, 2006

(30) Foreign Application Priority Data
Jun. 30, 2004    (JP) ............................. 2004-192965

(51) Int. Cl.
*A47K 1/08* (2006.01)
(52) U.S. Cl. .................. 248/311.2; 248/309.1; 224/483
(58) Field of Classification Search ............. 248/284.1, 248/292.14, 299.1, 278.1, 311.2, 309.1, 316; 224/483, 926, 282
See application file for complete search history.

(56) References Cited

U.S. PATENT DOCUMENTS

| | | | | | |
|---|---|---|---|---|---|
| 882,854 | A | * | 3/1908 | Weaver ..................... | 248/311.2 |
| 1,594,535 | A | * | 8/1926 | Lindbeck .................... | 220/478 |
| 2,648,516 | A | * | 8/1953 | Manetti et al. ............ | 248/311.2 |
| 3,071,288 | A | * | 1/1963 | Gantner ........................ | 221/46 |
| 4,091,958 | A | * | 5/1978 | Zemke ........................ | 220/291 |
| 4,568,225 | A | * | 2/1986 | Alexandrov et al. ........ | 406/186 |
| 4,691,888 | A | * | 9/1987 | Cotterill ................... | 248/284.1 |
| 5,618,018 | A | * | 4/1997 | Baniak ...................... | 248/311.2 |
| 5,628,486 | A | * | 5/1997 | Rossman et al. .......... | 248/311.2 |
| 5,692,718 | A | * | 12/1997 | Bieck ....................... | 248/311.2 |
| 5,697,593 | A | * | 12/1997 | Bieck ....................... | 248/311.2 |
| 6,065,729 | A | * | 5/2000 | Anderson ................ | 248/311.2 |
| 6,427,960 | B1 | * | 8/2002 | Gehring et al. ........... | 248/311.2 |
| 6,470,627 | B2 | * | 10/2002 | Fukuo .......................... | 49/260 |
| 2002/0050501 | A1 | * | 5/2002 | Shimajiri ..................... | 224/282 |
| 2005/0224676 | A1 | * | 10/2005 | Stavermann ............. | 248/311.2 |

FOREIGN PATENT DOCUMENTS

| | | |
|---|---|---|
| JP | A-08-156698 | 6/1996 |
| JP | A-2002-178818 | 6/2002 |
| JP | A-2002-362237 | 12/2002 |
| JP | A-2003-118467 | 4/2003 |
| JP | A-2004-025967 | 1/2004 |

* cited by examiner

*Primary Examiner*—Kimberly T. Wood
(74) *Attorney, Agent, or Firm*—Posz Law Group, PLC

(57) ABSTRACT

A container holder includes a holder body, a cover, and a swing arm. The cover has a front end, a rear end, a first engager disposed adjacent to the rear end. The swing arm has a sliding groove extending in a direction crossing the up/down directions of the holder body, holds the first engager of the cover slidably and swingably with the sliding groove, and is held swingably to the holder body at one of the opposite ends. When the swing arm swings the cover from a close position to an open position, the swing arm lets the cover pass firstly a semi-open position, at which the sliding groove guides the cover so as to decline the rear end of the cover, and then lets the cover swing to the open position along with the swinging swing arm.

4 Claims, 5 Drawing Sheets

CONTAINER HOLDER

BACKGROUND OF THE INVENTION

1. Field of the Invention

The present invention relates to a container for holding or accommodating containers for drinks therein.

2. Description of the Related Art

A container holder for holding containers for drinks has been known, container holder which comprises a holder body. The holder body is formed as a box shape substantially, has an opening opened upward, and demarcates an accommodation space. The container holder holds containers, which are fitted into the holder body, within the accommodation space. Such a container holder is usually provided with a cover which opens and closes the opening of the holder body.

Container holders are usually disposed in limited spaces, represented by automotive passenger rooms, for instance. Accordingly, it is needed to form container holders as less bulky shapes as possible. However, note herein that container holders provided with covers might turned out to be bulky, because the covers might project greatly outward from the container holders when they open the openings. Consequently, a container holder has been developed in order to avoid the drawback, container which can accommodate a cover in a holder body when the cover opens an opening of the holder body. FIG. 8 and FIG. 9 schematically illustrate cross-sectional views of such a conventional container holder.

As illustrated in FIG. 8, a conventional container holder 100 comprises a box-shaped holder body 101, and a plate-shaped cover 102. The holder body 101 demarcates an accommodation space 103 for holding containers therein. The accommodation space 103 opens upward. Moreover, the cover 102 has a leg 105 at one of the opposite ends, and an engager 106. The leg 105 extends into the accommodation space 103. The engager 106 is formed at the leading end of the leg 105. In addition, the engager 106 is held swingably to one of the inner side walls of the holder body 101 demarcating the accommodation space 103.

In the conventional container holder 100, the cover 102 swings about the engager 106 to move from a close position, at which the cover 102 covers an opening 107 of the holder body 101 as illustrate in FIG. 8, to an open position, at which the cover 102 opens the opening 107 as illustrated in FIG. 9, or vice versa. Thus, the swinging cover 102 opens and closes the opening 107 of the holder body 101.

In the thus constructed conventional container holder 100, a rear end 110 of the cover 102, one of the opposite ends of the cover 102, makes a leading end when the cover 102 swings from the close position to the open position. However, the rear end 110 of the swinging cover 102 might interfere with an inner periphery 111 of the holder body 101 which demarcates the opening 107. In order to inhibit such interference, it is necessary to provide a clearance "a" between the outer periphery of the cover 102 and the inner periphery 111 of the holder body 101's opening 107 as illustrated in FIG. 8. However, providing the clearance between the outer periphery of the cover 102 and the inner periphery 111 of the holder body 101's opening 107 might impair the integrity between the cover 102 and the holder body 101 to result in a problem that the decorativeness of the conventional container holder 100 deteriorates. Moreover, the clearance "a" might result in a problem that thin foreign matters, such as papers, fall down into the holder body 101 through the clearance "a." In order to solve these problems, it is better not to provide the clearance "a." Thus, the conventional container holder 100 might suffer from the trade-off circumstances.

Moreover, a front end 112 of the cover 102, the other one of the opposite ends of the cover 102, makes a trailing end when the cover 102 swings from the close position to the open position. However, as illustrated in FIG. 9, the front end 112 keeps projecting upward from the holder body 101 when the cover 102 swings to the open position. A container might bump into the front end 112 of the cover 102, which thus projects upward from the holder body 101, when holding the container in the accommodation space 103 or removing the container, held in the accommodation space 103, from the accommodation space 103. In this instance, it might be less likely to hold containers in or remove them from the conventional container holder 101 so that there arises a problem as well that the usability of the conventional container holder 100 deteriorates. In order to make the projection of the front end 112 of the cover 102 less, it is needed to move the cover 102 greatly. However, the cover 102, which moves greatly, has enlarged its swing locus to result in a problem that the clearance "a" should be furthermore enlarged.

On the other hand, as disclosed in Japanese Unexamined Patent Publication (KOKAI) No. 2002-362,237, a cover can be disposed below the top surface of a holder body when the cover swings to the close position in order to make it possible to inhibit the rear end of the cover from interfering with the inner periphery of the holder body's opening. In this instance, since the center of the swinging cover's opening is disposed down below, the inner periphery of the holder body is disposed off the swing locus of the cover even when the projection of the cover, which swings to the open position, is made less by moving the cover greatly. Thus, it is possible to avoid the interference between the cover and the inner periphery of the holder body's opening, and consequently to narrow down the clearance width. In this arrangement, however, the freedom of designing container holder might degrade, because it is necessary to dispose the top surface of the cover at a position lower than the top surface of the holder body when the cover swings to the close position. Moreover, there might arise a problem that the decorativeness of container holder is poor, because a step is made between the top surface of the cover and the top surface of the holder body when the cover swings to the close position.

SUMMARY OF THE INVENTION

The present invention has been developed in view of the aforementioned circumstances. It is therefore an object of the present invention to provide a container holder which can satisfy both requirements, good decorativeness and usability, simultaneously.

A container holder according to the present invention can achieve the aforementioned object, and comprises:

a holder body formed as a box shape substantially, opened upward to form an opening, and demarcating an accommodation space;

a cover formed as a plate shape substantially, having a top surface, a front end, a rear end and a first engager disposed adjacent to the rear end, and opening and closing the opening of the holder body; and a swing arm having opposite ends and a sliding groove extending in a direction crossing the up/down directions of the holder body, holding the first engager of the cover slidably and swingably with the sliding groove, and held swingably to the holder body at one of the opposite ends;

the cover being moved between a close position, at which the cover covers the opening of the holder body, and an open position at which the cover opens the opening of the holder body while directing the rear end downward and disposing the front end below the top surface of the holder body, by the swinging swing arm;

the cover passing firstly a semi-open position, at which the sliding groove of the swing arm guides the cover so as to decline the rear end of the cover, and then swinging to the open position along with the swinging swing arm when moving from the close position to the open position.

The present container holder can preferably further comprise a guide arm having opposite ends, and held swingably to the holder body at one of the opposite ends, wherein:

the cover further has a second engager disposed adjacent to the front end, and held swingably to the guide arm.

In the preferable present container holder, the holder body can preferably have an inner side wall, and a guide for slidably and swingably holding the first engager of the cover, the guide comprising a first arc extending downward from an upper part of the inner side wall as an arc shape substantially, and a second arc continuing from a lower end of the first arc and extending further downward as an arc shape substantially.

The present container holder can preferably further comprise an urging member having opposite ends, held to the holder body at one of the opposite ends, held to the swing arm at the other one of the opposite ends, and urging the swing arm to swing.

In the present container holder, the cover passes firstly the semi-open position, at which the rear end of the cover decline when moving from the close position to the open position. Accordingly, it is possible to swing the rear end of the cover, which is likely to interfere with an inner periphery of the holder body's opening, below the top surface of the holder body. Consequently, it is possible to inhibit the rear end of the cover from interfering with an inner periphery of the holder body's opening even when providing a narrow-width clearance between the cover and the inner periphery of the holder body's opening.

Moreover, it is possible to avoid the interference between the rear end of the cover and an inner periphery of the holder body's opening, because the cover moves firstly to the semi-open position when moving from the close position to the open position, as described above. Consequently, the rear end of the cover hardly interferes with the inner periphery of the holder body's opening even when providing a greater swing locus for the cover. Therefore, it is possible to dispose the front end of the cover below the top surface of the holder body when the cover swings to the open position, while keeping the clearance between the rear end of the cover and the inner periphery of the holder body's opening as narrow as possible when the cover swings to the close position. As a result, it is possible to satisfy both requirements, good decorativeness and usability, simultaneously.

In addition, in the present container holder, not only the cover swings about the first engager relatively to the swing arm, but also it swings along with the swinging swing arm relatively to the holder body. Thus, the cover swings dual-axially. Accordingly, it is possible to move the cover on a smaller swing locus. Consequently, not only it is possible to more securely inhibit the rear end of the cover from interfering with an inner periphery of the holder body's opening, but also it is possible to make the clearance between the rear end of the cover and the inner periphery of the holder body's opening much smaller. Furthermore, the swing arm has the sliding groove. Accordingly, it is possible to move the cover greatly, but on a much smaller swing locus. Consequently, it is possible to make the clearance between the rear end of the cover and the inner periphery of the holder body's opening much smaller when the cover swings to the close position.

Moreover, when the present container holder further comprises a guide arm having opposite ends, and held swingably to the holder body at one of the opposite ends, in which the cover further has a second engager disposed adjacent to the front end, and held swingably to the guide arm, it is possible to guide the movement of the cover's front end with the guide arm. Accordingly, it is possible to swing the cover smoothly. In this instance, it is preferable that the holder body can have an inner side wall, and a guide for slidably and swingably holding the first engager of the cover, the guide comprising a first arc extending downward from an upper part of the inner side wall as an arc shape substantially, and a second arc continuing from a lower end of the first arc and extending further downward as an arc shape substantially. When the holder body has such a guide, it is possible to guide the movement of the cover with the first arc of the guide when the cover swings from the close position to the semi-open position, and to guide the movement of the cover with the second arc of the guide when the cover swings from the semi-open position to the open position. Consequently, it is possible to swing the cover much more smoothly.

In addition, when the present container holder further comprises an urging member having opposite ends, held to the holder body at one of the opposite ends, held to the swing arm at the other one of the opposite ends, and urging the swing arm to swing, it is possible to make an operational force required for moving the cover, that is, an operational force required for opening and closing the opening of the holder body, smaller. Accordingly, it is possible to enhance the usability of the present container holder.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for the purpose of illustration only and not intended to limit the scope of the appended claims.

EXAMPLES

Example No. 1

Figure 1:
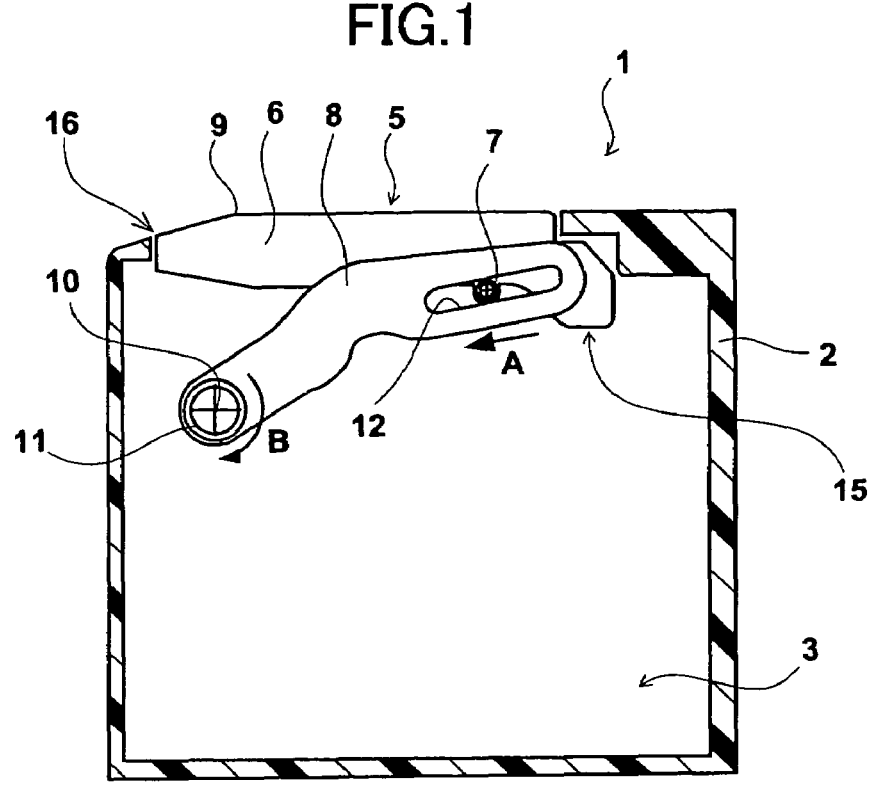
FIG. 1 is a cross-sectional view for schematically illustrating a container holder according to Example No. 1 of the present invention.
Figure 2:
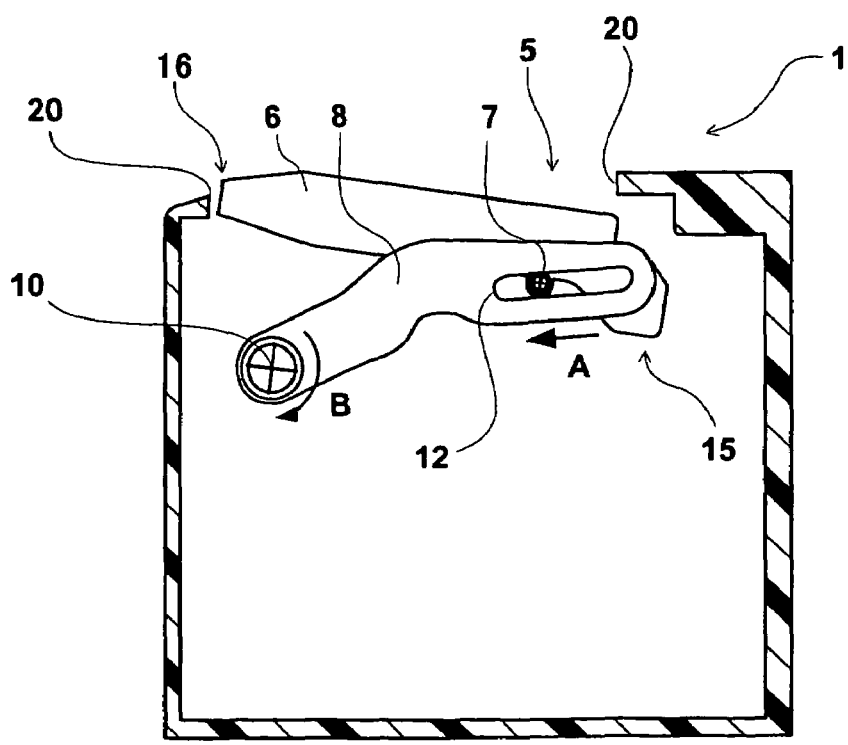
FIG. 2 is a cross-sectional view for schematically illustrating the container holder according to Example No. 1 of the present invention.

A container holder according to Example No. 1 of the present invention will be hereinafter described with reference to accompanying FIGS. 1 through 3 which illustrate the container holder schematically. Note that FIG. 1 represents the container holder with its cover positioned at the close position; FIG. 2 represents the container holder with its cover positioned at the semi-open position; and FIG. 3 illustrates the container holder with its cover positioned at the open position.

Figure 3:
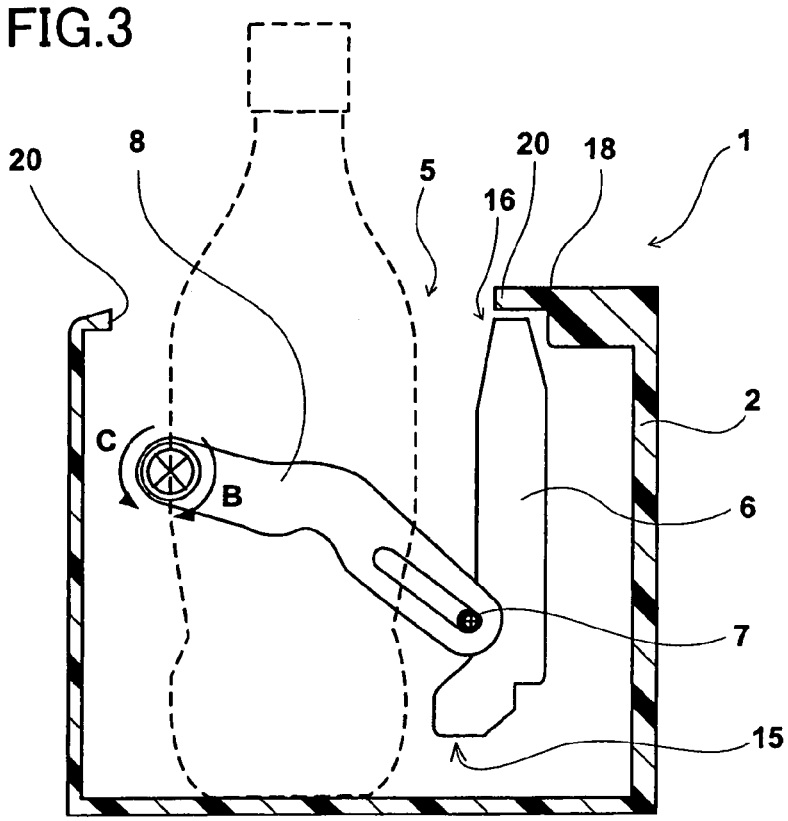
FIG. 3 is a cross-sectional view for schematically illustrating the container holder according to Example No. 1 of the present invention.

A container holder 1 shown in FIGS. 1 through 3 comprises a holder body 2, a cover 6, and a swing arm 8. The holder body 2 is formed as a box shape substantially. Moreover, the holder body 2 is opened upward to form an opening 5, and demarcates an accommodation space 3 within its box-shaped profile.

The opening 5 of the holder body 2 makes an inlet/outlet port for fitting a container into or removing it from the accommodation space 3 when holding the container with the container holder 1. The accommodation space 3 makes a space for accommodating the bottom of the container, which is fitted into the holder body 2 through the opening 5, at least.

The cover 6 opens and closes the opening 5 of the holder body 2. The cover 6 is formed as a plate shape whose top surface 9 is formed slightly smaller in size than the opening 5 of the holder body 2. Moreover, the cover 6 has an engagement portion 7 which is disposed adjacent to the rear end 15.

The swing arm 8, which is formed as a long plate shape, has a swing shaft 10 at one of the opposite ends. The holder body 2 has an inner side wall in which a pivotably-supporting hole 11 disposed at a front-side upper portion. The swing shaft 10 is fitted into the pivotably-supporting hole 11. Thus, the swing arm 8 is held to the holder body 2, and is disposed swingably about the swing shaft 10. Moreover, the swing arm 8 has a sliding groove 12 which is disposed away from the swing shaft 10. The sliding groove 12 extends in a direction crossing the up/down directions of the container holder 1. Note the "direction" herein designates an extending direction of the sliding groove 12 when the cover 6 swings to the close position to close the opening 5 of the holder body 2. The sliding groove 12 of the swing arm 8 holds the engagement portion 7 of the cover 6 slidably and swingably.

In the container holder 1 according to Example No. 1, the cover 6 moves between the close position, shown in FIG. 1, and the open position, shown in FIG. 3. At the close position, the cover 6 directs the top surface 9 upward, and is disposed to close the opening 5 of the holder body 2.

In the container holder 1 according to Example No. 1, the cover 6 first swings to the semi-open position shown in FIG. 2 when the cover 6 moves from the close position, shown in FIG. 1, to the open position, shown in FIG. 3. In this instance, the engagement portion 7 of the cover 6 slides within the sliding groove 12 of the swing arm 8 in the direction designated at the arrow "A" of FIGS. 1 and 2. At the same time, the swing arm 8 swings in the direction designated at the arrow "B" of FIGS. 1 and 2. Accordingly, the rear end 15 of the cover 6 declines as illustrated in FIG. 2. Then, the cover 6 swings to the open position, shown in FIG. 3, along with the swing arm 8, which swings in the direction designated at the arrow "B" of FIG. 2, after the cover 6 swings to the semi-open position, that is, after the rear end 15 of the cover 6 declines. Consequently, the swinging swing arm 8 swings the cover 6 to the open position, shown in FIG. 3, at which the front end 16 of the cover 6 is disposed below the top surface 18 of the holder body 2, while directing the rear end 15 of the cover 6 downward.

In the container holder 1 according to Example No. 1, not only the cover 6 swings about the engagement portion 7 relatively to the swing arm 8, but also it swings about the swing shaft 10 of the swinging swing arm 8 relatively to the holder body 2. Thus, the cover 6 swings dual-axially. Accordingly, compared with the case where the cover 6 swings uniaxially, the cover 6 can move greatly, but on a smaller swing locus. Consequently, the rear end 15 of the cover 6 can be inhibited from interfering with the inner periphery 20 of the holder body 2's opening 5. As a result, even if the front end 16 of the cover 6 is disposed below the top surface 18 of the holder body 2 when the cover 6 swings to the open position, the clearance between the rear end 15 of the cover 6 and the inner periphery 20 of the opening 5 can be made smaller when the cover 6 swings to the close position.

Moreover, the swing arm 8 has the sliding groove 12. Accordingly, the cover 6 swings about the engagement portion 7 while sliding relatively to the swing arm 8. Consequently, the cover 6 can move more greatly, but on a much smaller swing locus. As a result, the rear end 15 of the cover 6 is further less likely to interfere with the inner periphery 20 of the opening 5. In addition, the cover 6 first passes the semi-open position when moving from the close position to the open position. Accordingly, the rear end 15 of the cover 6, which is likely to interfere with the inner periphery 20 of the opening 5, is disposed below the inner periphery 20. Consequently, the rear end 15 of the cover 6 is furthermore less likely to interfere with the inner periphery 20 of the opening 5. All in all, not only the rear end 15 of the cover 6 can be inhibited from interfering with the inner periphery 20 of the opening 5 much more reliably, but also the clearance between the rear end 15 of the cover 6 and the inner periphery 20 of the opening 5 can be made much smaller when the cover 6 swings to the close position.

In the container holder 1 according to Example No. 1, the clearance between the rear end 15 of the cover 6 and the inner periphery 20 of the opening 5 can be made smaller when the cover 6 swings to the close position. Accordingly, good decorativeness can be given to the container holder 1. Moreover, the front end 16 of the cover 6 can be disposed below the top surface 18 of the holder body 2, as shown in FIG. 3, when the cover 6 swings to the open position. Consequently, it is possible to avoid such a drawback that a container might bump into the front end 16 of the cover 6 when holding the container in the accommodation space 3 or removing the container, held in the accommodation space 3, from the accommodation space 3. As a result, good usability can be given to the container holder 1.

In the container holder 1 according to Example No. 1, note that the top surface 9 of the cover 6 is flush with the top surface 18 of the holder body 2 substantially when the cover 6 swings to the close position, as described above. This advantage results from the arrangement that the cover 6 can move greatly, but on a smaller swing locus. The cover 6, whose top surface 9 is flush with the top surface 18 of the holder body 2 substantially when the cover 6 swings to the close position, enhances the integrity of the cover 6 with the holder body 2. Accordingly, the decorativeness of the container holder 1 upgrades furthermore. In the container holder 1, however, note that the top surface 9 of the cover 6 can be disposed below the top surface 18 of the holder body 2 when the cover 6 swings to the close position. In this instance, the decorativeness of the holder container 1 might be inferior to that in which the top surface 9 of the cover 6 is flush with the top surface 18 of the holder body 2 substantially. However, the degree of freedom in designing the container holder 1 enlarges advantageously, compared with the conventional container holder 100 whose cover 102 swings uniaxially, because the cover 6 can move greatly, but on a much smaller swing locus.

In the container holder 1 according to Example No. 1, the cover 6 is moved manually to swing the cover 6 from the close position to the open position, or vice versa, to open and close the opening 5 of the holder body 2. However, it is possible to add a known switching mechanism, for instance, to the container holder 1 in order to open and close the opening 5 of the holder body 2 by turning on and off the switching mechanism. In this instance, the turned-on switching mechanism can be interlocked with the swing arm 8, which swings in the direction designated at the arrow "B" of FIGS. 1 and 2, in order to move the cover 6 from the close position to the open position when the switching mechanism is turned on; and the turned-off switching mechanism can be interlocked with the swing arm 8, which swings in the direction designated at the arrow "C" of FIG. 3, in order to move the cover 6 from the open position to the close position when the switching mechanism is turned off, for example. The container holder 1 with such a switching mechanism added produces an advantage that the cover 6 can open and close the opening 5 of the holder body 2 with good operability. If such is the case, it is possible to move the cover 6 by a force which results from turning on or off the switching mechanism to act onto the cover 6. Alternatively, it is possible to move the cover 6 by a force which results from turning on or off the switching mechanism to act onto the swing arm 8.

Example No. 2

A container holder according to Example No. 2 of the present invention will be hereinafter described. FIGS. 4 through 7 illustrate the container holder according to Example No. 2 schematically.

Specifically, in addition to a modified cover 6, that is, the cover 6 of the container holder 1 according to Example No. 1 which has a second engager (or engagement portion) disposed adjacent to the front end 16, the container holder 1 according to Example No. 2 further comprises a guide arm, a guide, and an urging member (or actuator).

The container holder 1 according to Example No. 1 comprises the modified cover 6 which has a second engagement portion 25 disposed at the front end 16, as shown in FIGS. 4 through 7. Except for the second engagement portion 25, the modified cover 6 is the same as that of the above-described container holder 1 according to Example No. 1. The second engagement portion 25 is formed as a shaft which projects in the same direction as the engagement portion 7.

A holder body 2 is opened upward to form an opening 5, and demarcates an accommodation space 3 within its box-shaped profile, similarly to that of the container holder 1 according to Example No. 1. Note that the holder body 2 has an inner side wall which has a guide 26 extending in the up/down directions, as shown in FIGS. 4 through 7. The guide 2 comprises two grooves which are formed as arc shapes substantially, are disposed one above the other, and are joined together. A first arc-shaped groove 27, the upper one of the guide 26, extends as a minor arc from top down. A second arc-shaped groove 28, the lower one of the guide 26, continues from the lower end of the first arc 27, and extends as a major arc further downward. The guide 26 holds the engagement portion 7 of the cover 6 slidably and swingably within the two arc-shaped grooves 27, 28.

The container holder 1 according to Example No. 2 further comprises a substantially-disk-shaped major-diameter gear 36. The major-diameter gear 36 has a shaft which is fitted into a pivotably-supporting hole 37 formed in the inner side wall of the holder body 2 which has the guide 26. Thus, the major-diameter gear 36 is held rotatably to the inner side wall of the holder body 2.

The container holder 1 according to Example No. 2 further comprises a guide arm 30 which is formed as a substantially-"S"-shaped long plate. The guide arm 30 has a swing shaft 31 at one of the opposite ends, and a pivotably-supporting hole 32 at the other one of the opposite ends. The swing shaft 31 of the guide arm 30 is fitted into a guide-arm pivotably-supporting hole 35 which is formed in the major-diameter gear 36 and is disposed on an outer side with respect to a hole 37 for pivotably supporting the major-diameter gear 36. Note that the pivotably-supporting hole 37 is formed in the inner side wall of the holder body 2 which has the pivotably-supporting hole 11 and guide 26. Thus, the guide arm 30 swings about the swing shaft 31 while being held to the holder body 2 by way of the major-diameter gear 36. Moreover, the guide arm 30 moves along with the rotating major-diameter gear 36. On the other hand, the second engagement portion 25 of the cover 6 is fitted into the pivotably-supporting hole 32 of the guide arm 30. Thus, the guide arm 30 holds the cover 6 swingably about the second engagement portion 25.

The container holder 1 according to Example No. 2 further comprises a modified swing arm 8, which is formed similarly to that of the container holder 1 according to Example No. 1. Specifically, except that the modified swing arm 8 has a minor-diameter gear 38 and swings along with the rotating minor-diameter gear 36, it is formed as the same shape as that of the container holder 1 according to Example No. 1. Note that the minor-diameter gear 38 of the modified swing arm 8 has a smaller diameter than that of the major-diameter gear 36, and is disposed about the swing shaft 10 of the swing arm 8 so as to mesh with the major-diameter gear 36. The sliding groove 12 of the swing arm 8 holds the engagement portion 7 of the cover 6 slidably and swingably. Note that, in the container holder 1 according to Example No. 2, both sliding groove 12 and guide 26 hold the engagement portion 7 swingably.

The container holder 1 according to Example No. 2 further comprises an actuator 42. For example, the actuator 42 comprises a torsion spring, and has opposite ends, a slide end 43 and a swing end 45. Note that the major-diameter gear 36 has a curved groove 40 which is disposed on an outer peripheral side with respect to the guide arm 30. The groove 40 holds the slide end 43 of the actuator 42 slidably. Thus, the swing arm 8 holds the slide end 43 of the actuator 42 by way of the major-diameter gear 36. Moreover, the inner side wall of the holder body 2, which has the pivotably-supporting hole 11, guide 26 and pivotably-supporting hole 37, holds the swing end 45 of the actuator 42 swingably.

In addition, the container holder 1 according to Example No. 2 further comprises a switching mechanism, though not show in FIGS. 4 through 7. The switching mechanism is for urging the swing arm 8 to swing, thereby opening and closing the opening 5 of the holder body 2. The switching mechanism urges the swing arm 8 to swing in the following manner: the switching mechanism slides the slide end 43 of the actuator 42 in the groove 40 of the major-diameter gear 36 when being turned on or off by an operator, and the actuator 42 contracts diametrically to yield a repulsive force for swinging the swing arm 8. For instance, the switching mechanism comprises an open switch, and a close switch. The open switch makes an operational end when opening the opening 5 of the holder body 2. The close switch makes another operational end when closing the opening 5 of the holder body 2. Both open switch and close switch have a top end, respectively, which is exposed beyond the top surface 18 of the holder body 2 and disposed movably in the up/down directions. The open switch is connected with an open-switch-side connector which couples the open switch with the slide end 43 of the actuator 42 when opening the opening 5 of the holder body 2. When the open switch is depressed to open the opening 5 of the holder body 2, the open-switch-side connector presses the slide end 43 of the actuator 42 to slide it forward in the groove 40 of the major-diameter gear 36. On the other hand, the close switch is connected with a close-switch-side connector which couples the close switch with the slide end 43 of the actuator 42 when closing the opening 5 of the holder body 2. When the close switch is depressed to close the opening 5 of the holder body 2, the close-switch-side connector presses the slide end 43 of the actuator 42 to slide it rearward in the groove 40 of the major-diameter gear 36.

How the container holder 1 according to Example No. 2 operates to open and close the opening 5 of the holder body 2 will be hereinafter described.

Figure 4:
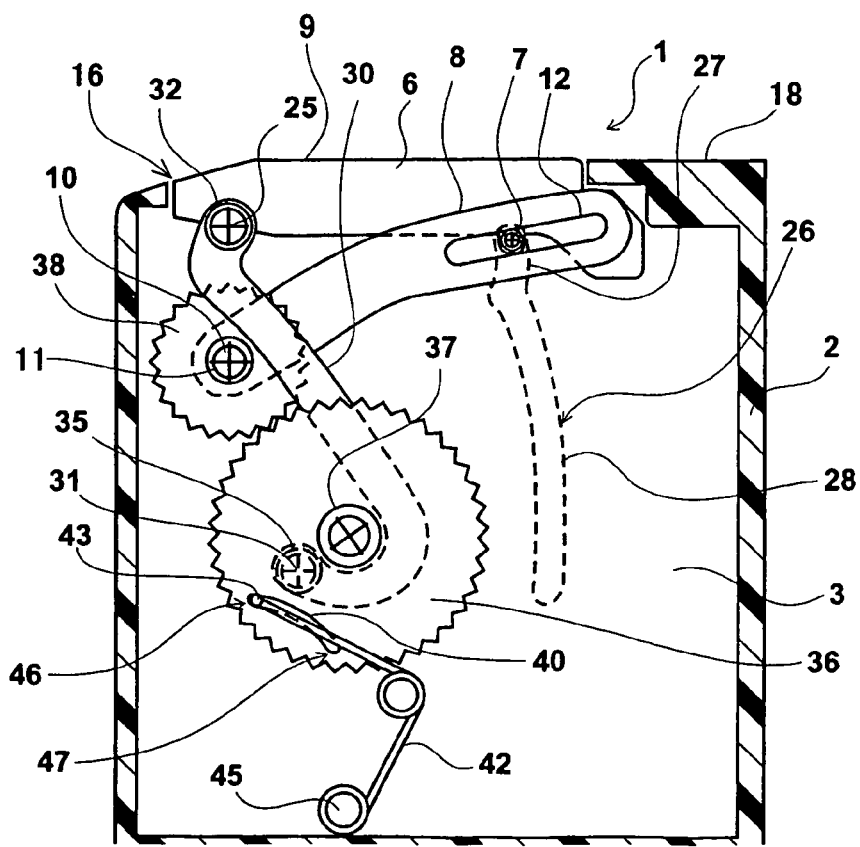
FIG. 4 is a cross-sectional view for schematically illustrating a container holder according to Example No. 2 of the present invention.

When opening the opening 5 of the holder body 2 by moving the cover 6 from the close position to the open position, the open switch of the switching mechanism is first depressed to slide the slide end 43 of the actuator 42 from a front end 46 to a rear end 47, designated in FIG. 4, in the groove 40 of the major-diameter gear 36. Accordingly, as illustrated in FIG. 5, the actuator 42 contracts diametrically while swinging in the direction designated at the arrow "D" of the drawing.

Figure 5:
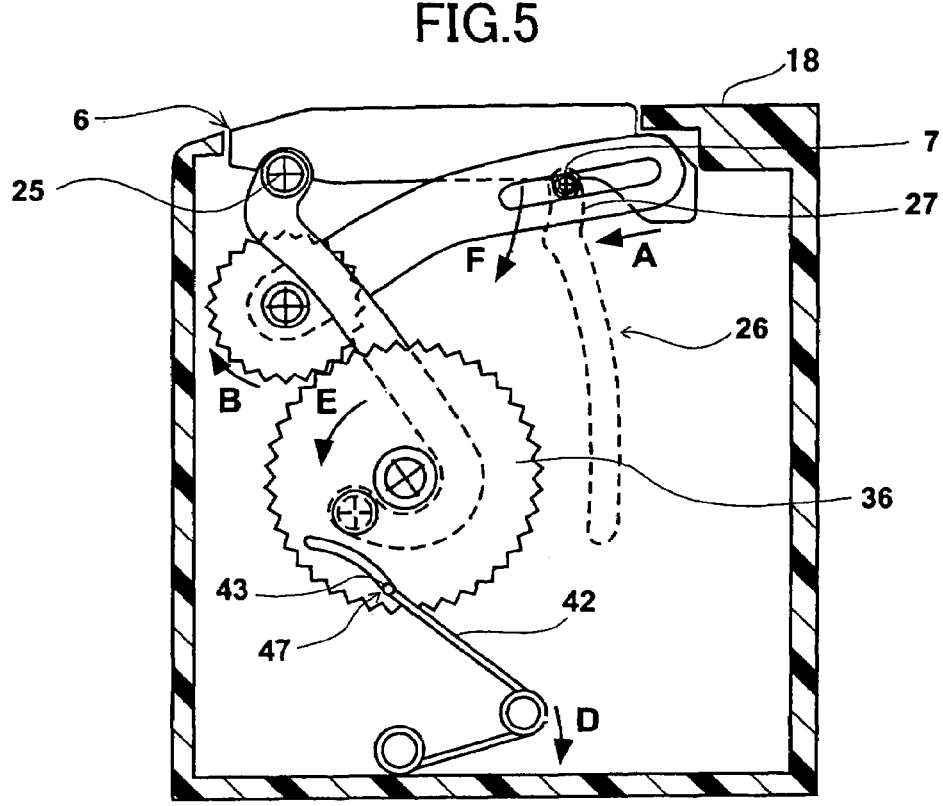
FIG. 5 is a cross-sectional view for schematically illustrating the container holder according to Example No. 2 of the present invention.
Figure 6:
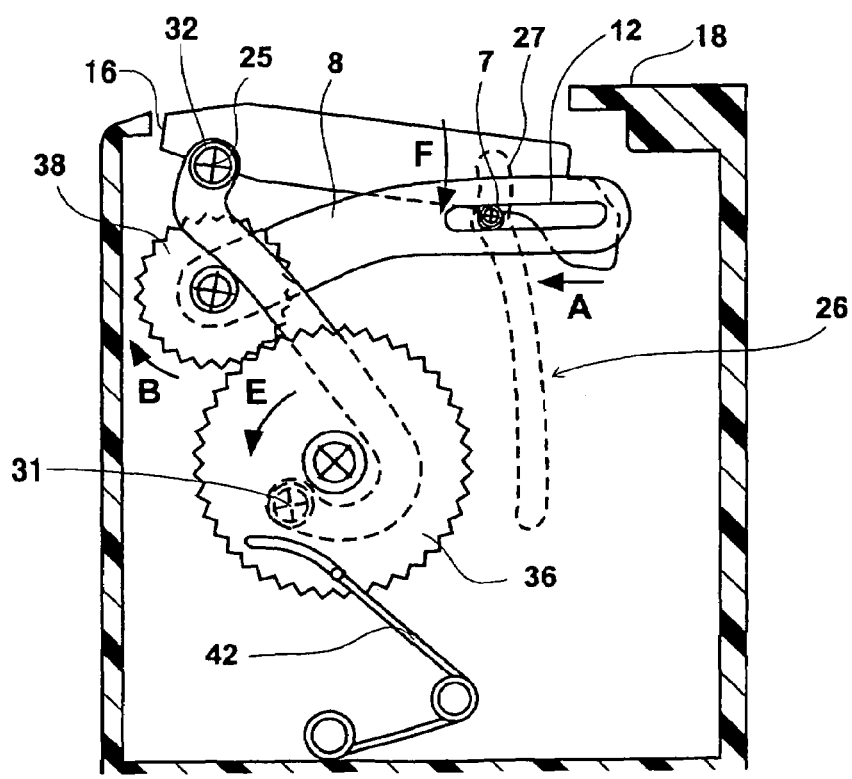
FIG. 6 is a cross-sectional view for schematically illustrating the container holder according to Example No. 2 of the present invention.

When the slide end 43 of the actuator 42 slides to the rear end 47 as shown in FIG. 5, the actuator 42 re-expands diametrically because it contracts diametrically beyond the neural point to accumulate a repulsive force. The actuator 42, which re-expands diametrically, urges the major-diameter gear 36. Accordingly, as illustrated in FIG. 6, the major-diameter gear 36 rotates in the direction designated at the arrow "E" of the drawing. Consequently, the major-diameter gear 36 rotates to swing the swing arm 8 whose minor-diameter gear 38 meshes with the major-diameter gear 36 in the direction designated at the arrow "B" of the drawing.

When the swing arm 8 swings in the direction designated at the arrow "B" of FIG. 6, the cover 6 moves along with the swinging arm 8. In this instance, the cover 6 first moves while the engagement portion 7 of the cover 6 is guided by the first arc 27 of the guide 26. That is, not only the cover 6 slides downward relatively to the swing arm 8 while the engagement portion 7 of the cover 6 being pressed and guided by the sliding groove 12 of the swing arm 8 to slide in the direction designated at the arrow "A" of the drawing, but also the cover 6 swings about the second engagement portion 25 in the direction, designated at the arrow "F" of the drawing, along the first arc 27 of the guide 26. Thus, the cover 6 moves to the semi-open position, shown in FIG. 6, at which the rear end 15 of the cover 6 declines. Moreover, in this occasion, the swing shaft 31 of the guide arm 30 moves downward so that the pivotably-supporting hole 32 of the guide arm 30 moves downward as well. Accordingly, the front end 16 of the cover 6, which is held in the pivotably-supporting hole 32 of the guide arm 30, descends. Consequently, the container holder 1 according to Example No. 2 inhibits the front end 16 of the cover 6 from projecting upward beyond the top surface 18 of the holder body 2 even when the cover 6 moves between the close position and the open position.

Thereafter, when the repulsive force of the actuator 42 further rotates the major-diameter gear 36 in the direction designated at the arrow "E" of FIG. 6, the swing arm 8 further swings in the direction designated at the arrow "B" of the drawing. Accordingly, the cover 6 moves while the engagement portion 7 is guided by the second arc 28 of the guide 26. In this instance, the second engagement portion 25 of the cover 6 moves while following the swinging swing arm 8. However, the second engagement portion 25 of the cover 6 moves on an arc-shaped swing locus about the swing shaft 31 of the guide arm 30, because the second engagement portion 25 is supported swingably by the guide arm 30. Consequently, the front end 16 of the cover 6 moves while being guided by the guide arm 30.

The swinging swing arm 8 moves the cover 6 to the open position, shown in FIG. 7, at which the front end 16 of the cover 6 is disposed below the top surface 18 of the holder body 2 while directing the rear end 15 of the cover 6 downward. Thus, the container holder 1 according to Example No. 2 opens the opening 5 of the holder body 2.

Figure 7:
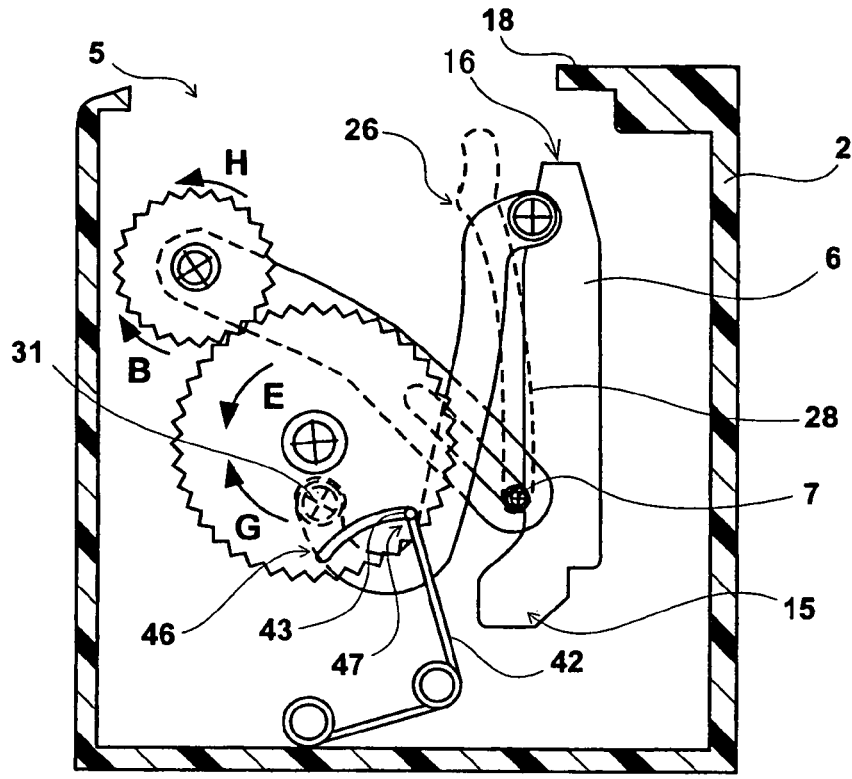
FIG. 7 is a cross-sectional view for schematically illustrating the container holder according to Example No. 2 of the present invention.
Figure 8:
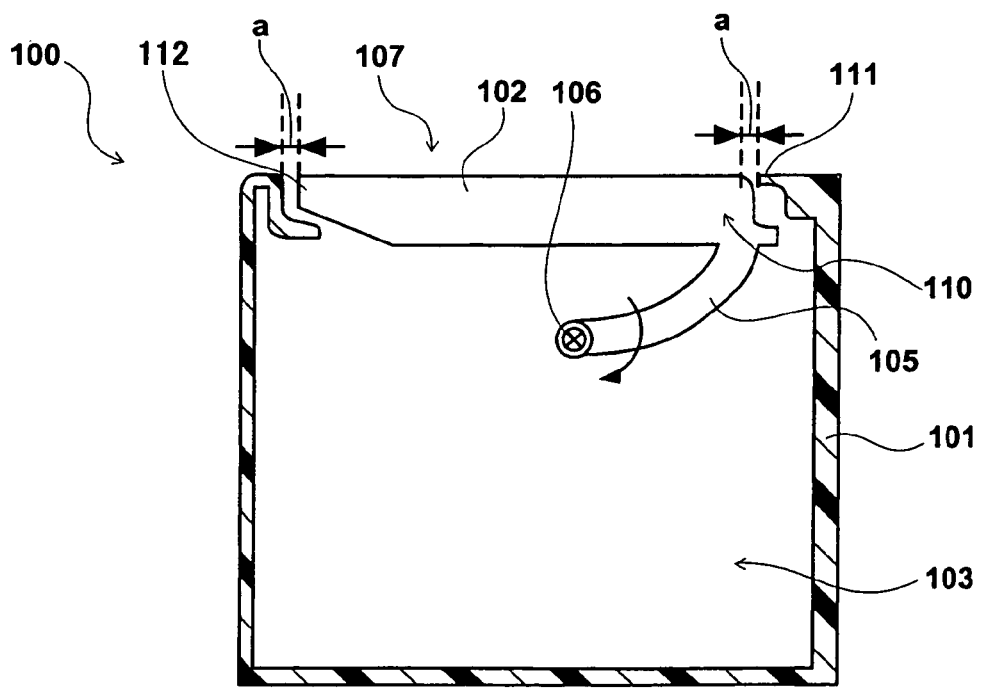
FIG. 8 is a cross-sectional view for schematically illustrating a conventional container holder.
Figure 9:
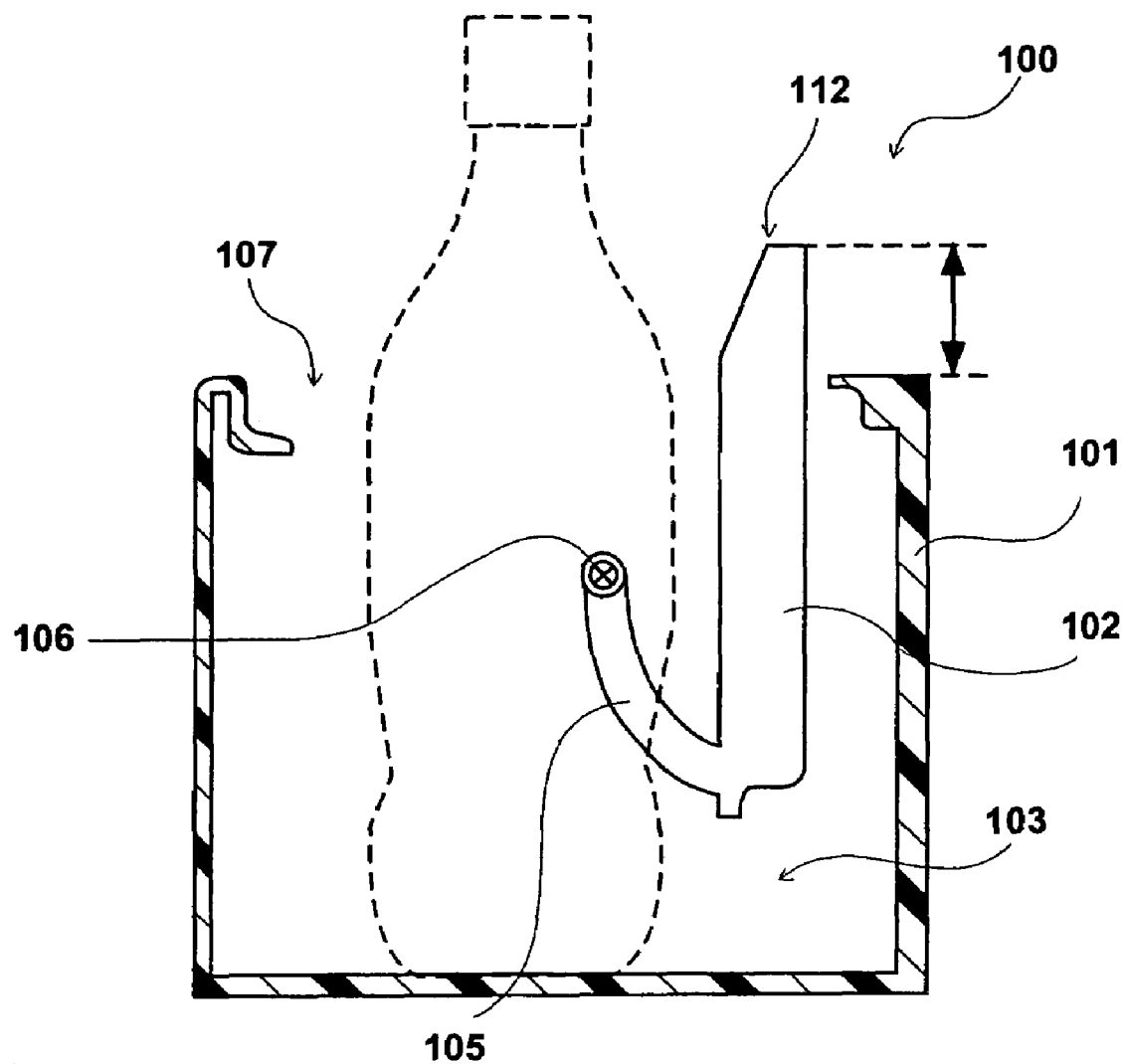
FIG. 9 is a cross-sectional view for schematically illustrating the conventional container holder.

On the contrary, when closing the opening 5 of the holder body 2 by moving the cover 6 from the open position to the close position, the close switch of the switching mechanism is depressed to slide the slide end 43 of the actuator 42 from the rear end 47 to the front end 46, designated in FIG. 7, in the groove 40 of the major-diameter gear 36. Accordingly, the actuator 42 contracts diametrically once. Then, the resulting repulsive force of the actuator 42 urges the major-diameter gear 36 in the direction designated at the arrow "G" of the drawing. Consequently, the swing arm 8 swings in the direction designated at the arrow "H" of the drawing. Thus, the cover 6 moves from the open position to the close position by way of the semi-open position.

In the container holder 1 according to Example No. 2, not only the cover 6 swings about the engagement portion 7 relatively to the swing arm 8, but also it swings about the swing shaft 31 of the swinging guide arm 30 relatively to the holder body 2. Thus, the cover 6 swings dual-axially, similarly to that of the container holder 1 according to Example No. 1. Additionally, the cover 6, which thus swings dual-axially, passes the semi-open position at which the rear end 15 of the cover 6 declines, because the engagement portion 7 of the cover 6 slides in the sliding groove 12 of the swing arm 8. Accordingly, the cover 6 can move greatly, but on a smaller swing locus. Consequently, the rear end 15 of the cover 6 can be inhibited from interfering with the inner periphery 20 of the opening 5. Moreover, not only the clearance between the rear end 15 of the cover 6 and the inner periphery 20 of the opening 5 can be made smaller when the cover 6 swings to the close position, but also the cover 6 can be disposed so as not to project the front end 16 beyond the top surface 18 of the holder body 2 when the cover 6 swings to the open position. All in all, the container holder 1 can satisfy both requirements, good decorativeness and usability, simultaneously.

In the container holder 1 according to Example No. 2 as well, the top surface 9 of the cover 6 is likewise flush with the top surface 18 of the holder body 2 substantially when the cover 6 swings to the close position. Accordingly, the integrity of the cover 6 with the holder body 2 enhances. Consequently, the container holder 1 demonstrates furthermore upgraded decorativeness.

Moreover, the container holder 1 according to Example No. 2 comprises the guide arm 30. The guide arm 30 guides the movement of the cover 6's front end 16 by way of the cover 6's second engagement portion 25. Accordingly, the container holder 1 produces an advantage that the cover 6 moves smoothly. In addition, the container holder 1 further comprises the guide 26 disposed in the holder body 2. The guide 26 guides the movement of the cover 6 by way of the cover 6's first engagement portion 7. Consequently, the cover 6 can move more smoothly.

Moreover, the container holder 1 according to Example No. 2 further comprises the actuator 42. The actuator 42 urges the swing arm 8 to swing. Accordingly, the force required for an operator to open and close the container holder 1 can be made less. Consequently, the container holder 1 offers furthermore enhanced usability. Note that the force required for an operator to open and close the container holder 1 can be made much less, because the actuator 42 is held to the swing arm 8 by way of the major-diameter gear 36.

Also note that, in the container holder 1 according to Example No. 2, the swinging guide arm 30 guides the movement of the cover 6's second engagement 25, namely, the movement of the cover 6's front end 16. However, it is possible to guide the movement of the cover 6's front end 16 by the other methods. For example, it is possible to guide the movement of the cover 6's front end 16*a* in the following manner: disposing a sliding rail, which is adapted for a desired swing locus of the cover 6's front end 16*a*, on the inner side wall of the holder body 2, which has the pivotably-supporting hole 11, guide 26 and pivotably-supporting hole 37; and sliding the second engagement portion 25 of the cover 6 on the sliding rail. In the thus modified version as well, it is possible to move the cover 6 smoothly.

Having now fully described the present invention, it will be apparent to one of ordinary skill in the art that many changes and modifications can be made thereto without departing from the spirit or scope of the present invention as set forth herein including the appended claims.

What is claimed is:

1. A container holder, comprising:
    a holder body formed as a box shape substantially, opened upward to form an opening, and demarcating an accommodation space;
    a cover formed as a plate shape substantially, having a top surface, a front end, a rear end and a first engager disposed adjacent to the rear end, and opening and closing the opening of the holder body; and
    a swing arm having opposite ends and a sliding groove extending in a direction crossing the up/down directions of the holder body, holding the first engager of the cover slidably and swingably with the sliding groove, and held swingably to the holder body at one of the opposite ends, wherein
    the cover is moved between a close position, at which the cover covers the opening of the holder body, and an open position, at which the cover opens the opening of the holder body, while directing the rear end downward and disposing the front end below the top surface of the holder body, by the swinging swing arm,
    the cover first passes a semi-open position, at which the sliding groove of the swing arm guides the cover so as to decline the rear end of the cover, and then swings to the open position along with the swinging swing arm when moving from the close position to the open position,
    the container holder further includes a guide arm having opposite ends,
    the guide arm is held swingably to the holder body at one of the opposite ends,
    the cover further has a second engager disposed adjacent to the front end,
    the second engager is held swingably to the guide arm,
    the holder body has an inner side wall and a guide for slidably and swingably holding the first engager of the cover, and
    the guide includes a first arc extending downward from an upper part of the inner side wall, in a substantial arc shape, and a second arc continuing from a lower end of the first arc and extending further downward, in a substantial arc shape.

2. The container holder set forth in claim 1 further comprising an urging member, which is constructed and arranged to apply force to the swing arm.

3. The container holder set forth in claim 1, wherein the cover swings firstly from the close position to the semi-open position about the front end.

4. The container holder set forth in claim 3, wherein the cover moves downward while swinging firstly from the close position to the semi-open position about the front end.

\* \* \* \* \*